US012698217B2

(12) United States Patent
Takiguchi Takemoto et al.

(10) Patent No.: US 12,698,217 B2
(45) Date of Patent: Aug. 4, 2026

(54) PRODUCTION METHOD FOR POSITIVE ELECTRODE ACTIVE MATERIAL

(71) Applicants: SUMITOMO CHEMICAL COMPANY, LIMITED, Tokyo (JP); Kyoto University, Kyoto (JP)

(72) Inventors: Marie Takiguchi Takemoto, Osaka (JP); Satoshi Shimano, Kyoto (JP)

(73) Assignees: SUMITOMO CHEMICAL COMPANY, LIMITED, Tokyo (JP); Kyoto University, Tokyo (JP)

( * ) Notice: Subject to any disclaimer, the term of this patent is extended or adjusted under 35 U.S.C. 154(b) by 8 days.

(21) Appl. No.: 19/105,692

(22) PCT Filed: Aug. 29, 2023

(86) PCT No.: PCT/JP2023/031246
§ 371 (c)(1),
(2) Date: Feb. 21, 2025

(87) PCT Pub. No.: WO2024/048589
PCT Pub. Date: Mar. 7, 2024

(65) Prior Publication Data
US 2026/0008693 A1     Jan. 8, 2026

(30) Foreign Application Priority Data

Aug. 31, 2022    (JP) ................................. 2022-137695

(51) Int. Cl.
*C01G 53/504*        (2025.01)
*H01M 4/505*         (2010.01)
*H01M 4/525*         (2010.01)

(52) U.S. Cl.
CPC .......... *C01G 53/504* (2025.01); *H01M 4/505* (2013.01); *H01M 4/525* (2013.01); *C01P 2002/50* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 2008/0044733 A1 | 2/2008 | Ohata et al. | |
| 2013/0323142 A1* | 12/2013 | Shimano ............... | H01M 4/505 |
| | | | 423/49 |
| 2016/0372802 A1 | 12/2016 | Chiang et al. | |
| 2023/0094145 A1 | 3/2023 | Shimano | |

FOREIGN PATENT DOCUMENTS

| | | |
|---|---|---|
| JP | 2005-353584 A | 12/2005 |
| JP | 2012-186150 A | 9/2012 |
| JP | 2018-022669 A | 2/2018 |
| JP | 2021-140996 A | 9/2021 |

OTHER PUBLICATIONS

International Preliminary Report on Patentability with Written Opinion mailed Nov. 7, 2023 in PCT Application No. PCT/JP2023/031246.

* cited by examiner

*Primary Examiner* — Mark Kopec
*Assistant Examiner* — Jaison P Thomas
(74) *Attorney, Agent, or Firm* — Rimon P.C.

(57)        ABSTRACT

A method for producing a positive electrode active material, includes the steps of (1) bringing an electrode mixture containing a positive electrode active material, a binder, and an electrolyte into contact with an electrolyte cleaning solvent to obtain a slurry containing a solid component and a liquid component, and then separating the slurry into the solid component and the liquid component, wherein an amount of P in the liquid component after separation is 0.0020 to 2.0 mass %, an amount of F in the liquid component after separation is 0.01 to 7.0 mass %, and an amount of P remaining in the solid component after separation is 0.7 mass % or less; (2) mixing an activation treatment agent with the separated solid component; and (3) heating a mixture obtained to activate the positive electrode active material contained in the mixture.

6 Claims, No Drawings

PRODUCTION METHOD FOR POSITIVE ELECTRODE ACTIVE MATERIAL

CROSS-REFERENCE TO RELATED APPLICATIONS

This application is the U.S. National Phase under 35 U.S.C. § 371 of International Application No. PCT/JP2023/031246, filed on Aug. 29, 2023, which claims the benefit of foreign priority to Japanese Patent Application No. 2022-137695, filed on Aug. 31, 2022, the entire contents of each of which are hereby incorporated by reference.

TECHNICAL FIELD

The present invention relates to a method for producing a positive electrode active material.

BACKGROUND ART

A rare metal component such as cobalt, nickel, manganese, or lithium is contained in a positive electrode active material of a battery, and particularly, a compound containing the rare metal component as a main component is used in a positive electrode active material of a non-aqueous electrolyte secondary battery. In order to preserve resources of rare metal components, a method for reproducing a rare metal component from a battery waste material of a secondary battery is required.

For example, Patent Literature 1 discloses a method for recovering a positive electrode active material by mixing an electrode mixture with an activation treatment agent containing an alkali metal compound, heating the mixture to decompose a binder, and removing a decomposition product and the activation treatment agent with water or the like. This method is excellent in terms of cost in that a positive electrode active material is directly recovered from a battery waste material without using an organic solvent.

CITATION LIST

Patent Literature

Patent Literature 1: Japanese Unexamined Patent Application Publication No. 2012-186150

SUMMARY OF INVENTION

Technical Problem

In order to suitably reuse a positive electrode active material after reproduction, it is required to prevent deterioration of the positive electrode active material before and after a reproduction step. Deterioration of a positive electrode active material is undesirable as it leads to a decrease in the performance of a battery using a positive electrode active material after regeneration, for example, a decrease in charge and discharge capacity and an increase in internal resistance.

An object of the present invention is to provide a method for producing a positive electrode active material capable of preventing deterioration of the positive electrode active material.

Solution to Problem

[1] A method for producing a positive electrode active material, including the steps of:

(1) bringing an electrode mixture containing a positive electrode active material, a binder, and an electrolyte into contact with an electrolyte cleaning solvent to obtain a slurry containing a solid component and a liquid component, and then separating the slurry into the solid component and the liquid component, wherein an amount of P in the liquid component after separation is 0.0020 to 2.0 mass %, an amount of F in the liquid component after separation is 0.01 to 7.0 mass %, and an amount of P remaining in the solid component after separation is 0.7 mass % or less;

(2) mixing an activation treatment agent containing one type or two or more types of alkali metal compounds with the separated solid component; and (3) heating a mixture obtained to a holding temperature equal to or higher than a melting start temperature of the activation treatment agent to activate the positive electrode active material contained in the mixture.

The method according to [1], wherein the positive electrode active material is a composite oxide containing one or more types of elements selected from the following element group 1 and one or more types of elements selected from the following element group 2:

element group 1: Ni, Co, Mn, Fe, Al, and P;

element group 2: Li, Na, K, Ca, Sr, Ba, and Mg.

[3] The method according to [1] or [2], wherein the positive electrode active material is represented by the following formula:

$$Li_{1+a}M^2{}_bM^1{}_cM^T{}_cO_{2+d}X_e$$

wherein $M^2$ represents at least one type of element selected from the group consisting of Na, K, Ca, Sr, Ba, and Mg, $M^1$ represents at least one type of element selected from the group consisting of Ni, Co, Mn, Fe, Al, and P, $M^T$ represents at least one type of element selected from the group consisting of transition metal elements other than Ni, Co, Mn and Fe, X represents at least one type of element selected from the group consisting of nonmetallic elements except O and P, and $-0.4 < a < 1.5$, $0 \leq b < 0.5$, $0 \leq c < 0.5$, $-0.5 < d < 1.5$, and $0 \leq e < 0.5$ are satisfied.

[4] The method according to any one of [1] to [3], wherein in the step (1), a concentration of the solid component with respect to a volume of the slurry is 3 to 2,000 g/L.

[5] The method according to any one of [1] to [4], wherein in the step (1), a contact time between the solid component and the liquid component is 1 minute or more and less than 25 hours.

[6] The method according to any one of [1] to [5], wherein in the step (1), the electrode mixture and the electrolyte cleaning solvent are stirred to obtain the slurry.

Advantageous Effects of Invention

A positive electrode active material can be produced from an electrode mixture while preventing deterioration of the positive electrode active material.

DESCRIPTION OF EMBODIMENTS (Method for Producing Positive Electrode Active Material)

Hereinafter, a method for producing a positive electrode active material related to recycling will be described.

The method for producing a positive electrode active material according to an embodiment of the present invention includes the steps of:

(1) bringing an electrode mixture containing a positive electrode active material, a binder, and an electrolyte into contact with an electrolyte cleaning solvent to obtain a slurry containing a solid component and a liquid component, and then separating the slurry into the solid component and the liquid component, wherein an amount of P in the liquid component after separation is 0.0020 to 2.0 mass %, an amount of F in the liquid component after separation is 0.01 to 7.0 mass %, and an amount of P remaining in the solid component after separation is 0.7 mass % or less;

(2) mixing an activation treatment agent containing one type or two or more types of alkali metal compounds with the separated solid component; and (3) heating a mixture obtained to a holding temperature equal to or higher than a melting start temperature of the activation treatment agent to activate the positive electrode active material contained in the mixture.

Hereinafter, each step in the present embodiment will be described in detail.

Step (1): Electrolyte-Containing Electrode Mixture Cleaning Step

A step of bringing an electrode mixture containing a positive electrode active material, a binder, and an electrolyte into contact with an electrolyte cleaning solvent to obtain a slurry containing a solid component and a liquid component, and then separating the slurry into the solid component and the liquid component, wherein an amount of P in the liquid component after separation is 0.0020 to 2.0 mass %, an amount of F in the liquid component after separation is 0.01 to 7.0 mass %, and an amount of P remaining in the solid component after separation is 0.7 mass % or less <Electrode Mixture before Contact with Electrolyte Cleaning Solvent>

The electrode mixture before contact contains a positive electrode active material, a binder, and an electrolyte, and the positive electrode active material is bound to each other by the binder. The electrode mixture may further contain a conductive material, and in this case, the positive electrode active material and the conductive material are bound to each other by the binder. The electrolyte is a component derived from the electrolytic solution of a battery and impregnated into the electrode mixture.

<Positive Electrode Active Material>

An example of the positive electrode active material is a composite compound containing lithium, oxygen, fluorine, sodium, magnesium, aluminum, silicon, phosphorus, sulfur, potassium, calcium, titanium, vanadium, chromium, manganese, iron, cobalt, nickel, copper, zinc, gallium, yttrium, niobium, molybdenum, silver, indium, tungsten, or the like as a constituent element.

The positive electrode active material may be formed of only a single compound or may be formed of a plurality of compounds.

An example of a suitable positive electrode active material is a composite oxide containing one or more types of elements selected from the following element group 1 and one or more types of elements selected from the following element group 2:

element group 1: Ni, Co, Mn, Fe, Al, and P;

element group 2: Li, Na, K, Ca, Sr, Ba, and Mg.

Among them, the positive electrode active material is preferably represented by the following chemical formula (formula A).

$$Li_{1+a}M^2{}_bM^1M^T{}_cO_{2+d}X_e$$

$M^2$ represents at least one type of element selected from the group consisting of Na, K, Ca, Sr, Ba, and Mg, M1 represents at least one type of element selected from the group consisting of Ni, Co, Mn, Fe, Al, and P, MT represents at least one type of element selected from the group consisting of transition metal elements other than Ni, Co, Mn and Fe, X represents at least one type of element selected from the group consisting of nonmetallic elements except O and P, and $-0.4 < a < 1.5$, $0 \le b < 0.5$, $0 \le c < 0.5$, $-0.5 < d < 1.5$, and $0 \le e < 0.5$ are satisfied.

$M^T$ is preferably at least one type of element selected from the group consisting of Cu, Ti, Mg, Al, W, Mo, Nb, Zn, Sn, Zr, Ga, V, B, Si, Ca, Sr, Ba, Ge, Cr, Sc, Y, La, Ta, Tc, Ru, Rh, Pd, Ag, Cd, and In.

The positive electrode active material is preferably a composite oxide containing at least Li and Ni.

In the positive electrode active material, the molar fraction of Ni in $M^1$ is more preferably 0.3 to 0.95.

The crystal structure of the composite oxide as the positive electrode active material is not particularly limited, and a layered structure is preferable, and a hexagonal or monoclinic crystal structure is more preferable.

The hexagonal crystal structure belongs to any one space group selected from the group consisting of P3, P3$_1$, P3$_2$, R3, P-3, R-3, P312, P321, P3$_1$12, P3$_1$21, P3$_2$12, P3$_2$21, R32, P3m1, P31m, P3c1, P31c, R3m, R3c, P-31m, P-31c, P-3m1, P-3c1, R-3m, R-3c, P6, P6$_1$, P6$_5$, P6$_2$, P6$_4$, P6$_3$, P-6, P6/m, P6$_3$/m, P622, P6$_1$22, P6$_5$22, P6$_2$22, P6$_4$22, P6$_3$22, P6 mm, P6cc, P6$_3$cm, P6$_3$mc, P-6m2, P-6c2, P-62m, P-62c, P6/mmm, P6/mcc, P6$_3$/mcm, and P6$_3$/mmc.

The monoclinic crystal structure belongs to any one space group selected from the group consisting of P2, P2$_1$, C2, Pm, Pc, Cm, Cc, P2/m, P2$_1$/m, C2/m, P2/c, P2$_1$/c, and C2/c.

Further, it is preferred to belong to the space group of R-3m included in the hexagonal crystal structure or the space group of C2/m included in the monoclinic crystal structure.

The crystal structure of the positive electrode active material is identified from a powder X-ray diffraction pattern obtained by powder X-ray diffractometry using a CuKα ray as a radiation source.

The particle diameter of the positive electrode active material in the electrode mixture is not particularly limited, and is usually about 0.001 to 100 μm. The particle size distribution of the positive electrode active material can be measured using a laser diffraction scattering particle size distribution measuring apparatus (for example, Mastersizer 2000 manufactured by Malvern Panalytical Ltd.). From the obtained particle size distribution, a volume-based cumulative particle size distribution curve is created, and the value of the particle diameter (D50) at 50% accumulation from the fine particle side can be taken as the average particle diameter of the powder. In addition, the particle diameter of the primary particles of the positive electrode active material can be measured as an arithmetic average of equivalent circle diameters in an electron micrograph.

<Conductive Material>

Examples of the conductive material are a metal-based conductive material such as metal particles and a carbon-based conductive material made of a carbon material.

Specific examples of the carbon-based conductive material are a graphite powder, carbon black (for example, acetylene black), and a fibrous carbon material (for example, graphitized carbon fibers, carbon nanotubes).

The carbon-based conductive material may be a single carbon material or may be formed of a plurality of carbon materials.

The specific surface area of the carbon material used as the carbon-based conductive material can be usually 0.1 to 500 $m^2$/g.

In that case, the conductive material can be formed only of a carbon-based conductive material of 30 $m^2$/g or more, and may be carbon black of 30 $m^2$/g or more, or acetylene black of 30 $m^2$/g or more.

When an activation treatment agent containing an alkali metal compound having an oxidizing power described later is used, the rate of the oxidation treatment of the carbon-based conductive material can be increased, and even a carbon material having a small specific surface area can be oxidized in some cases.

<Binder>

An example of the binder (binder before activation treatment) contained in the electrode mixture is a thermoplastic resin, and specific examples thereof include fluororesins such as polyvinylidene fluoride (hereinafter sometimes referred to as PVdF), polytetrafluoroethylene (hereinafter sometimes referred to as PTFE), an ethylene tetrafluoride-propylene hexafluoride-vinylidene fluoride-based copolymer, a propylene hexafluoride-vinylidene fluoride-based copolymer, and an ethylene tetrafluoride-perfluorovinyl ether-based copolymer; polyolefin resins such as polyethylene and polypropylene; a styrene-butadiene copolymer (hereinafter sometimes referred to as SBR); and a mixture of two or more thereof may also be used.

The blending amounts of the positive electrode active material, the conductive material, and the binder in the electrode mixture are not particularly limited. The blending amount of the binder can be 0.5 to 30 parts by weight and may be 1 to 5 parts by weight with respect to 100 parts by weight of the positive electrode active material. The blending amount of the conductive material may be 0, but can be 0 to 50 parts by weight, and may be 1 to 10 parts by weight with respect to 100 parts by weight of the positive electrode active material.

<Electrolyte>

Examples of the electrolyte are $LiPF_6$, $LiBF_4$, $LiClO_4$, $LiN(SO_2CF_3)_2$, $LiN(SO_2F)_2$, and $LiCF_3SO_3$. The amount of the electrolyte contained in the electrode mixture is not limited, and can be 0.0005 to 7 mass %.

The electrode mixture may contain a solvent derived from the electrolytic solution. Examples of the solvent are dimethyl carbonate, diethyl carbonate, and ethyl methyl carbonate.

Such an electrode mixture can be obtained by separating and recovering the electrode mixture from a waste electrode having a current collector and an electrode mixture layer.

The "waste electrode" can be an electrode recovered from a discarded battery and a waste of an electrode generated in a process for producing an electrode or a battery. The discarded battery may be a used battery or a battery which is unused but out of specification. In addition, the waste of an electrode can be an end portion of an electrode generated in a step of producing a battery and an electrode out of specification. In addition, it is also possible to use a waste product of an electrode mixture which is generated in a step of producing an electrode mixture and is not attached to a current collector.

The electrode includes a current collector that is a metal foil such as an aluminum foil or a copper foil, and an electrode mixture layer provided on the current collector. The electrode mixture layer may be provided on one surface of the current collector or may be provided on both surfaces thereof.

Examples of the method for separation from an electrode mixture from an electrode having an electrode mixture layer and a current collector include a method for mechanically releasing the electrode mixture layer from the current collector (for example, a method for scraping off the electrode mixture from the current collector), a method for releasing the electrode mixture layer from the current collector by infiltrating a solvent into an interface between the electrode mixture layer and the current collector, and a method for separating the electrode mixture layer by dissolving the current collector using an alkaline or acidic aqueous solution. A preferred method is a method for mechanically releasing the electrode mixture layer from the current collector.

(Step of Contacting Electrode Mixture with Electrolyte Cleaning Solvent)

Subsequently, an electrolyte cleaning solvent is brought into contact with the prepared electrode mixture to remove at least a part of the electrolyte from the electrode mixture. Specifically, an electrode mixture containing a positive electrode active material, a binder, and an electrolyte is brought into contact with an electrolyte cleaning solvent to obtain a slurry containing a solid component and a liquid component, and then the slurry is separated into the solid component and the liquid component.

The solid-liquid separation is a step of separating the slurry into a liquid component and a solid component. The solid-liquid separation method may be a conventionally known method, and examples thereof include filtration and a centrifugation method.

The electrolyte cleaning solvent is not particularly limited. Examples thereof include carbonate esters such as ethylene carbonate, dimethyl carbonate, ethyl methyl carbonate, diethyl carbonate, and propylene carbonate; water; ketones such as acetone, methyl ethyl ketone, diethyl ketone, and methyl isobutyl ketone; and alcohols such as ethanol, methanol, propanol, and isopropyl alcohol.

The bringing the electrolyte cleaning solvent into contact with the electrode mixture can be performed with a known device for contacting a powder with a liquid, for example, a stirring tank or the like.

In the step of bringing the electrode mixture into contact with the electrolyte cleaning solvent, the slurry concentration, that is, the concentration of the solid component with respect to the volume of the slurry is preferably 3 to 2,000 g/L.

In the step of bringing the electrode mixture into contact with the electrolyte cleaning solvent, it is preferable to obtain a slurry by stirring the electrode mixture and the electrolyte cleaning solvent. The peripheral speed of the tip of a stirring blade can be set to 0.1 to 1.0 m/s.

In the step of cleaning the electrode mixture, the obtained solid component may be rinsed after solid-liquid separation.

The rinsing is an operation of obtaining a slurry by bringing an electrolyte cleaning solvent into contact with the obtained solid component again and then separating the slurry into a solid component and a liquid component again. In the cleaning of the electrode mixture, rinsing may be performed a plurality of times. The slurry concentration in the rinsing can also be set in the same manner as described above. Also in the rinsing, the slurry can be stirred as described above.

In the step of cleaning the electrode mixture, the contact time between the solid component and the liquid component is preferably 1 minute or more and less than 25 hours. The contact time between the solid component and the liquid component in the step of cleaning the electrode mixture is a time during which the electrode mixture is in contact with the electrolyte cleaning solvent. For example, when rinsing is not performed, the contact time between the solid component and the liquid component is a time A required from the start of contact between the electrode mixture (solid component) containing the electrolyte and the electrolyte cleaning solvent to the completion of the operation of subjecting the slurry to solid-liquid separation into the solid component and the liquid component. When rinsing is performed, the contact time between the solid component and the liquid component is the sum of the time A and a time B required from the start of contact between the solid component after separation and the electrolyte cleaning solvent to the completion of solid-liquid separation into the solid component and the liquid component in each rinsing step. When solid-liquid separation is performed by filtration, the completion time of solid-liquid separation is the end time of filtration.

In the present step (1), the amount of P in the liquid component after solid-liquid separation is 0.0020 to 2.0 mass %, the amount of F therein is 0.01 to 7.0 mass %, and the amount of P remaining in the solid component after solid-liquid separation is 0.7 mass % or less.

Since the amount of P and the amount of F in the liquid component after solid-liquid separation and the amount of P in the solid component after solid-liquid separation are not too high, the electrolyte can be sufficiently removed from the electrode mixture. For example, when the electrolyte remains, the following reaction occurs, and the structure of the positive electrode active material changes from a layered rock salt structure to a spinel structure.

$$LiPF_6 + 16LiMO_2 + 2O_2 \longrightarrow 6LiF + Li_3PO_4 + 8LiM_2O_4$$

In addition, when lithium carbonate is contained as an activator, consumption of lithium by the following reaction also occurs.

$$LiPF_6 + 4Li_2CO_3 \longrightarrow 6LiF + Li_3PO_4 + 4CO_2$$

On the other hand, since the amount of P and the amount of F in the liquid component after solid-liquid separation are not too low, deterioration of the positive electrode active material due to excessive cleaning is prevented.

When the rinsing step is performed once or a plurality of times, the contents of P and F in the total liquid component in which the liquid component obtained by the first solid-liquid separation and the liquid component obtained by the subsequent solid-liquid separation of rinsing once or a plurality of times are all mixed satisfy 0.0020 to 2.0 mass % and 0.01 to 7.0 mass %, respectively. When the rinsing step is performed once or a plurality of times, the content of P in the solid component obtained by the final solid-liquid separation satisfies 0.7 mass % or less. When cleaning is performed continuously, the contents of P and F with respect to the liquid component continuously discharged from the device need only be in the above range.

In both a case where rinsing is not performed and a case rinsing is performed once or a plurality of times, in the cleaning of the electrode mixture, it is preferable that the content of P in the liquid component obtained by the final solid-liquid separation is 2.0 mass % or less and the content of F therein is 7.0 mass % or less, and it is also preferable that the content of P is 0.0020 mass % or more and the content of F is 0.01 mass % or more. When cleaning is performed continuously, the amount of P and the amount F with respect to the liquid component discharged from the device need only be in the range of 0.0020 to 2.0 mass % and the range of 0.01 to 7.0 mass %, respectively.

The lower limit of the amount of P remaining in the solid component after solid-liquid separation may be 0.0001 mass %. The amount of F remaining in the solid component after solid-liquid separation can be set to 3.5 mass % or less, and may be 0.0001 mass % or more.

The separated solid component can be subjected to drying of the electrolyte cleaning solvent by depressurization and/or heating as necessary. The heating temperature can be set to 50 to 200° C.

Subsequently, the following step (2) is performed.

Step (2): Activation Treatment Agent Mixing Step a step of mixing an activation treatment agent containing one type or two or more types of alkali metal compounds with the solid component to obtain a mixture The mixing method of the electrode mixture and the activation treatment agent may be either dry mixing or wet mixing, or a combination of these mixing methods, and the mixing order is also not particularly limited.

At the time of mixing, it is preferable to pass through a step of pulverizing and mixing using a mixing device provided with a mixing medium such as a ball, and thus mixing efficiency can be improved.

As the mixing method, dry mixing is preferable in that mixing can be performed more easily. In the dry mixing, a V-type mixer, a W-type mixer, a ribbon mixer, a drum mixer, a powder mixer having a stirring blade therein, a ball mill, a vibration mill, or a combination of these devices can be used.

As the mixing device used for dry mixing, a powder mixer having a stirring blade therein is preferable, and specific examples thereof include a Loedige mixer (manufactured by MATSUBO Corporation).

Hereinafter, the activation treatment agent used in the present step will be described in detail.

<Activation Treatment Agent>

The activation treatment agent contains one type or two or more types of alkali metal compounds. The activation treatment agent preferably contains at least one type of compound selected from the group consisting of a potassium compound and a sodium compound. The activation treatment agent may contain an alkali metal compound containing another alkali metal such as Li in addition to a potassium compound and/or a sodium compound.

When the activation treatment agent comes into contact with the positive electrode active material, the positive electrode active material can be activated. When the alkali metal compound in the activation treatment agent particularly includes a molten portion, the contact performance between the molten portion and the positive electrode active material is improved, so that the activation of the positive electrode active material is further promoted.

In addition, the electrode mixture may contain a fluorine-containing compound derived from the binder and/or the electrolytic solution, but by bringing the fluorine-containing compound into contact with the activation treatment agent, the fluorine component is stabilized as an alkali metal fluoride, so that generation of a corrosive gas such as hydrogen fluoride can be prevented. It is desirable to prevent the generation also because hydrogen fluoride lowers the activity of the positive electrode active material.

The proportion of the total alkali metal compound in the activation treatment agent is appropriately set in consideration of the type of the alkali metal compound, the type of the target positive electrode active material, and the like, and is usually 50 wt % or more, and preferably 70 wt % or more (including 100 wt %) with respect to the total weight of the activation treatment agent.

The concentration of at least one type of alkali metal selected from the group consisting of potassium and sodium among the alkali metals contained in the alkali metal compound can be arbitrarily adjusted to 0 to 100 mol %, and is preferably 10 mol % or more, more preferably 20 mol % or more, and is preferably 90 mol % or less, more preferably 80 mol % or less.

Examples of the alkali metal compound to be a component of the activation treatment agent include hydroxides, borates, carbonates, oxides, peroxides, superoxides, nitrates, phosphates, sulfates, chlorides, vanadates, bromides, molybdates, and tungstates of alkali metals. These can be used alone or two or more of these can be used in combination as a component of the activation treatment agent.

Specific examples of suitable alkali metal compounds include hydroxides such as LiOH, NaOH, KOH, RbOH, and CsOH;

boric oxides such as $LiBO_2$, $NaBO_2$, $KBO_2$, $RbBO_2$, and $CsBO_2$;

carbonates such as $Li_2CO_3$, $Na_2CO_3$, $K_2CO_3$, $RbCO_3$, and $CsCO_3$;

oxides such as $Li_2O$, $Na_2O$, $K_2O$, $Rb_2O$, and $Cs_2O$;

peroxides such as $Li_2O_2$, $Na_2O_2$, $K_2O_2$, $Rb_2O_2$, and $Cs_2O_2$;

superoxides such as $LiO_2$, $NaO_2$, $KO_2$, $RbO_2$, and $CsO_2$;

nitrates such as $LiNO_3$, $NaNO_3$, $KNO_3$, $RbNO_3$, and $CsNO_3$;

phosphates such as $Li_3PO_4$, $Na_3PO_4$, $K_3PO_4$, $Rb_3PO_4$, and $Cs_3PO_4$;

sulfates such as $Li_2SO_4$, $Na_2SO_4$, $K_2SO_4$, $Rb_2SO_4$, and $Cs_2SO_4$;

chlorides such as LiCl, NaCl, KCl, RbCl, and CsCl;

bromides such as LiBr, NaBr, KBr, RbBr, and CsBr;

vanadates such as $LiVO_3$, $NaVO_3$, $KVO_3$, $RbVO_3$, and $CsVO_3$;

molybdates such as $Li_2MoO_4$, $Na_2MoO_4$, $K_2MoO_4$, $Rb_2MoO_4$, and $CsMoO_4$; and tungstates such as $Li_2WO_4$, $Na_2WO_4$, $K_2WO_4$, $Rb_2WO_4$, and $CsWO_4$.

Here, in order to further enhance the activation effect of the positive electrode active material, the activation treatment agent can contain the same alkali metal element as the alkali metal element contained in the positive electrode active material in the electrode mixture in addition to at least one type selected from the group consisting of a potassium compound and a sodium compound.

That is, when the positive electrode active material in the electrode mixture is a lithium composite oxide, the activation treatment agent preferably contains a lithium compound in addition to at least one type of compound selected from the group consisting of a potassium compound and a sodium compound. Suitable examples of the lithium compound include LiOH, $LiBO_2$, $Li_2CO_3$, $Li_2O$, $Li_2O_2$, $LiO_2$, $LiNO_3$, $Li_3PO_4$, $Li_2SO_4$, LiCl, $LiVO_3$, LiBr, $Li_2MoO_4$, and $Li_2WO_4$.

The activation treatment agent may contain a compound other than the alkali metal compound as necessary. Examples of the compound other than the alkali metal compound include an alkaline earth metal compound containing an alkaline earth metal element such as magnesium, calcium, or barium. The alkaline earth metal compound is contained in the activation treatment agent together with the alkali metal compound for the purpose of controlling the melting start temperature of the activation treatment agent.

In addition, the content of the compound other than the alkali metal compound in the activation treatment agent is selected as long as the effect derived from the above-mentioned molten alkali metal compound is not significantly inhibited, and is less than 50 wt % of the total weight of the activation treatment agent.

The addition amount of the activation treatment agent in the mixture of the electrode mixture and the activation treatment agent is preferably 0.001 to 100 times and more preferably 0.05 to 1 times the weight of the positive electrode active material contained in the electrode mixture.

The number of moles of the alkali metal compound in the activation treatment agent in the mixture of the electrode mixture and the activation treatment agent can be added so that the number of moles of the alkali metal element is 0.001 to 200 times when the number of moles of the positive electrode active material (for example, formula A) contained in the electrode mixture is taken as 1.

By appropriately controlling the proportion of the activation treatment agent in the mixture, the cost required for recovering the positive electrode active material from the electrode mixture can be reduced, and the oxidative decomposition treatment rate of the carbon-based conductive material and the binder can be increased. In addition, the effect of preventing generation of a corrosive gas in the heating step can be improved, and furthermore, the discharge capacity of a battery produced using the obtained positive electrode active material can be further increased.

In addition, at least one type of alkali metal compound contained in the activation treatment agent is preferably an alkali metal compound that exhibits alkalinity when dissolved in water. When the activation treatment agent containing such an alkali metal compound is dissolved in pure water, the pH of the solution is more than 7. Hereinafter, such an activation treatment agent is sometimes referred to as an "alkaline activation treatment agent".

Use of the alkaline activation treatment agent can further prevent generation of a corrosive gas in the heating step, so that the discharge capacity of a battery produced using the recovered positive electrode active material can be further increased. In addition, use of the alkaline activation treatment agent can also increase the treatment rate of the carbon-based conductive material and the binder.

Examples of the alkali metal compound that is contained in the alkaline activation treatment agent and exhibits alkalinity when dissolved in water include hydroxides, carbonates, bicarbonates, oxides, peroxides, and superoxides of alkali metals. Specific examples thereof include LiOH, NaOH, KOH, RbOH, CsOH; $Li_2CO_3$, $Na_2CO_3$, $K_2CO_3$, $RbCO_3$, $CsCO_3$; $LiHCO_3$, $NaHCO_3$, $KHCO_3$, $RbHCO_3$, $CsHCO_3$; $Li_2O$, $Na_2O$, $K_2O$, $Rb_2O$, $Cs_2O$; $Li_2O_2$, $Na_2O_2$, $K_2O_2$, $Rb_2O_2$, $Cs_2O_2$; $LiO_2$, $NaO_2$, $KO_2$, $RbO_2$, and $CsO_2$.

One type or two or more types of these may be incorporated in the activation treatment agent.

When the conductive material contained in the electrode mixture is a carbon-based conductive material, at least one type of alkali metal compound contained in the activation treatment agent may be an alkali metal compound having an oxidizing power that oxidatively decomposes the carbon-based conductive material at the temperature of the heating step. Hereinafter, the activation treatment agent containing such an alkali metal compound is sometimes referred to as an "activation treatment agent having an oxidizing power".

When the activation treatment agent having such an oxidizing power is used, it is particularly effective in promoting oxidation of the conductive material, which is a carbon material, to carbon dioxide and promoting oxidation of the binder, which is a hydrocarbon material, to carbon dioxide and water vapor, the discharge capacity of a battery produced using the obtained positive electrode active material can be further increased, and further, the effect of preventing generation of a corrosive gas in the heating step can be improved in some cases.

Examples of the alkali metal compound having an oxidizing power necessary for oxidizing a carbon-based conductive material and a hydrocarbon into carbon dioxide and water vapor include peroxides, superoxides, nitrates, sulfates, vanadates, and molybdates of alkali metals. One type or two or more types of these may be mixed and used.

Specific examples thereof include $Li_2O_2$, $Na_2O_2$, $K_2O_2$, $Rb_2O_2$, $Cs_2O_2$; $LiO_2$, $NaO_2$, $KO_2$, $RbO_2$, $CsO_2$; $LiNO_3$, $NaNO_3$, $KNO_3$, $RbNO_3$, $CsNO_3$; $Li_2SO_4$, $Na_2SO_4$, $K_2SO_4$, $Rb_2SO_4$, $Cs_2SO_4$; $LiVO_3$, $NaVO_3$, $KVO_3$, $RbVO_3$, $CsVO_3$; $Li_2MoO_4$, $Na_2MoO_4$, $K_2MoO_4$, $Rb_2MoO_4$, and $CsMoO_4$.

Details of the oxidizing power of these alkali metal compounds are described in Japanese Unexamined Patent Application Publication No. 2012-186150.

Step (3): Heating Step

The heating step is a step of heating the mixture (hereinafter sometimes referred to as "mixture before heating") obtained in the step (2) to a temperature equal to or higher than the melting start temperature of the activation treatment agent. The mixture obtained in the present heating step is sometimes referred to as "mixture after heating" or "mixture after step (3)".

The "melting start temperature (Tmp) of the activation treatment agent" means the lowest temperature at which a part of the activation treatment agent exhibits a liquid phase.

The melting start temperature (Tmp) of the activation treatment agent is a value obtained by a differential thermal analysis (DTA). That is, 5 mg of the mixture before heating is subjected to a differential thermal analysis (DTA, measurement conditions: temperature raising rate: 10° C./min), and the temperature at which the DTA signal shows an endothermic peak is defined as the melting start temperature (Tmp).

The melting start temperature (Tmp) of the activation treatment agent is preferably 700° C. or lower, and more preferably 600° C. or lower. There is no lower limit to the melting start temperature (Tmp) of the activation treatment agent, and the lower limit may be, for example, 150° C.

The melting point of the activation treatment agent means the lowest temperature at which a part of the activation treatment agent exhibits a liquid phase when only the activation treatment agent is heated. By mixing the electrode mixture with the activation treatment agent, the melting start temperature (Tmp) of the activation treatment agent becomes lower than the melting point of the activation treatment agent.

The melting point of the activation treatment agent is a value obtained by a differential thermal analysis (DTA). Specifically, 5 mg of the activation treatment agent is subjected to a differential thermal analysis (DTA, measurement conditions: temperature raising rate: 10° C./min), and the temperature at which the DTA signal shows an endothermic peak is defined as the melting point of the activation treatment agent.

The atmosphere in the heating is not particularly limited, and may be an oxygen-containing gas such as air, nitrogen, argon, or carbon dioxide. The pressure of the atmosphere is not particularly limited, and can be atmospheric pressure, but may be a reduced pressure atmosphere or a pressurized atmosphere.

In the step (3), by heating the mixture before heating to a temperature equal to or higher than the melting start temperature (Tmp) of the activation treatment agent as described above, the following action occurs.

By contacting the activation treatment agent in a molten state with the positive electrode active material, deterioration of the crystal structure of the positive electrode active material can be prevented. In some cases, it is also possible to obtain a crystal structure repair action.

By contacting the activation treatment agent in a molten state with the carbon-based conductive material and the binder, the rate of oxidative decomposition of the conductive material and the binder is improved, and furthermore, by contacting the activation treatment agent in a molten state with a fluorine compound derived from the binder and the electrolytic solution, the fluorine component is stabilized as an alkali metal fluoride, generation of hydrogen fluoride which is a corrosive gas is prevented, and deterioration of the crystal structure of the positive electrode active material is prevented.

Furthermore, when the activation treatment agent contains the same alkali metal as the positive electrode active material, it is also possible to supply the alkali metal that is lacking to the positive electrode active material.

The temperature of the heating step and the holding time at the temperature can be appropriately adjusted depending on the type and combination of the positive electrode active material, the conductive material, the binder, and the alkali metal compound and other compounds contained in the activation treatment agent constituting the electrode mixture. Usually, the temperature is in the range of 100 to 1,500° C., and the holding time is about 10 minutes to 24 hours.

The temperature in the heating step is preferably higher than the melting point of the alkali metal compound contained in the activation treatment agent. The melting point of the alkali metal compound may be lower than the melting point of the simple substance of each compound by mixing a plurality of types of compounds. When the activation treatment agent contains two or more types of alkali metal compounds, the eutectic point is defined as the melting point of the alkali metal compound.

After the heating step, the mixture can be cooled to any temperature, for example, about room temperature or the like, if necessary.

Subsequently, at least one of the following steps (4) to (6) can be performed as necessary.

Step (4): Solid-Liquid Separation Step (Step of Removing Alkali Metal)

A step of bringing the mixture after heating into contact with a water-containing liquid to obtain a slurry containing a solid component and a liquid component, and then separating the slurry into the solid component and the liquid component The mixture after heating contains, in addition to the positive electrode active material, a component derived from the activation treatment agent (such as an alkali metal compound), an undecomposed conductive material or binder, and other undecomposed materials of the electrode mixture. When an electrolytic solution containing a fluorine component is contained in the electrode mixture, a fluorine component derived from the electrolyte may be contained.

In order to separate and recover the positive electrode active material from the mixture after heating, a water-containing liquid is added to the mixture to form a slurry, which is then subjected to solid-liquid separation and separated into a solid component and a liquid component.

The liquid used in the slurrying step is not particularly limited as long as it contains water. The amount of water in the liquid may be 50 mass % or more. In order to increase the solubility of a water-soluble component or to increase the treatment rate, a component other than water may be added to the liquid to adjust the pH.

Preferred examples of the water-containing liquid include pure water and an alkaline cleaning liquid. Examples of the alkaline cleaning liquid include aqueous solutions of one or more types of anhydrides and hydrates thereof selected from the group consisting of lithium hydroxide, sodium hydroxide, potassium hydroxide, lithium carbonate, sodium carbonate, potassium carbonate, and ammonium carbonate. Ammonia can also be used as the alkali.

The obtained slurry contains a solid component mainly containing the positive electrode active material and a liquid component containing a water-soluble component other than the positive electrode active material. The liquid component contains an alkali metal component derived from the activation treatment agent and/or a fluorine component derived from the binder and the electrolytic solution.

The amount of the liquid to be added to the mixture is appropriately determined in consideration of the amounts of the positive electrode active material and the water-soluble components other than the positive electrode active material contained in the mixture.

In the step (4), it is preferable to bring the mixture after heating into contact with the water-containing liquid so that the slurry concentration, that is, the concentration of the solid component with respect to the volume of the slurry is 12 to 1,000 g/L.

In the step (4), it is preferable to obtain a slurry by stirring the mixture after heating and the water-containing liquid. This accelerates the dissolution of the water-soluble component. It is preferable to set the peripheral speed of the tip of the stirring blade to 0.1 to 0.9 m/s.

The slurry formed in the slurrying step is then subjected to solid-liquid separation. The solid-liquid separation is a step of separating the slurry into a liquid component and a solid component. The solid-liquid separation method may be a conventionally known method, and examples thereof include filtration and a centrifugation method.

In the step (4), the obtained solid component may be rinsed after solid-liquid separation. The rinsing is an operation of obtaining a slurry by bringing a water-containing liquid into contact with the obtained solid component again and then separating the slurry into a solid component and a liquid component again. In the step (4), rinsing may be performed a plurality of times. The slurry concentration in the rinsing can also be set in the same manner as described above.

In the step (4), the contact time between the solid component and the liquid component is preferably 4 minutes or more and less than 24 hours. The contact time between the solid component and the liquid component in the step (4) is a time during which the positive electrode active material is in contact with the water-containing liquid. For example, when rinsing is not performed, the contact time between the solid component and the liquid component is a time C required from the start of contact between the mixture after heating and the water-containing liquid to the completion of the operation of subjecting the slurry to solid-liquid separation into the solid component and the liquid component. When rinsing is performed, the contact time between the solid component and the liquid component is the sum of the time C and a time D required from the start of contact between the solid component after separation and the water-containing liquid to the completion of solid-liquid separation into the solid component and the liquid component in each rinsing step. When solid-liquid separation is performed by filtration, the completion time of solid-liquid separation is the end time of filtration.

In the step (4), the total content of potassium and sodium in the liquid component obtained by solid-liquid separation is preferably 0.090 to 2.0 mass %, and the total content of potassium and sodium in the solid component obtained by solid-liquid separation is preferably 1.2 mass % or less.

Since the total content of potassium and sodium in the liquid component and the total content of potassium and sodium in the solid component after solid-liquid separation are not too high, the alkali metal component from the electrode mixture can be sufficiently removed. On the other hand, since the total content of potassium and sodium in the liquid component is not too low, deterioration of the positive electrode active material due to excessive cleaning is prevented.

When the rinsing step is performed once or a plurality of times, the total content of potassium and sodium in the total liquid component in which the liquid component obtained by the first solid-liquid separation and the liquid component obtained by the subsequent solid-liquid separation of rinsing once or a plurality of times are all mixed satisfies 0.090 to 2.0 mass %. When the rinsing step is performed once or a plurality of times, the total content of potassium and sodium in the solid component obtained by the final solid-liquid separation satisfies 1.2 mass % or less. When cleaning is performed continuously, the total content of potassium and sodium with respect to the liquid component continuously discharged from the device need only be in the range of 0.090 to 2.0 mass %. In both a case where rinsing is not performed and a case rinsing is performed once or a plurality of times, in the cleaning of the electrode mixture, it is preferable that the total content of potassium and sodium in the liquid component obtained by the final solid-liquid separation is 0.090 to 2.0 mass %.

The lower limit of the total content of potassium and sodium in the separated solid component may be 0.001 mass %.

Step (5): Drying Step

The step (5) is a step of removing water from the solid component by heating the solid component obtained in the step (4) and/or exposing it to a reduced-pressure environment. Here, it is preferable to change the environmental atmospheric pressure and/or the temperature of the solid component so that the ratio of the saturated water vapor pressure of water at the temperature of the solid component to the environmental atmospheric pressure at which the solid component exists becomes 80% or more within 24 hours after the slurry is separated into the solid component and the liquid component.

When the ratio of the saturated water vapor pressure of water at the temperature of the solid component to the environmental atmospheric pressure at which the solid component exists is 80% or more, a condition in which water is sufficiently removed from the solid component is provided.

As described above, since such a condition is reached within 24 hours after the slurry is separated into the liquid component and the solid component, the time during which the solid component is exposed to a wet environment is shortened, whereby the deterioration of the positive electrode active material can be prevented.

Specifically, for example, the following reaction may proceed in a wet environment.

$$2LiMO_2 + H_2O \longrightarrow 2LiOH + M_2O_3$$

In addition, the following reaction may also proceed in a wet environment containing carbon dioxide such as in the air.

$$2LiMO_2 + CO_2 \longrightarrow Li_2CO_3 + M_2O_3$$

Specifically, a condition in which water is sufficiently removed from the solid component only by decompression may be reached, a condition in which water is sufficiently removed from the solid component only by heating may be reached, or a condition in which water is sufficiently removed from the solid component by heating and decompression may be reached.

The time until the ratio of the saturated water vapor pressure at the temperature of the solid component to the environmental atmospheric pressure at which the solid component exists becomes 80% or more can be measured by monitoring the environmental pressure at which the solid component exists and the temperature of the solid component. Specifically, for example, sensors such as a pressure gauge and a hygrometer provided in a dryer may be used.

The heating temperature is preferably 100° C. or higher in order to remove water. It is preferable to set the temperature to 150° C. or higher in order to more sufficiently remove water. In particular, a temperature of 250° C. or higher is preferable because the discharge capacity of a battery produced using the obtained positive electrode active material is further increased. The temperature in the drying step may be constant, or may be changed stepwise or continuously. The reaching temperature range by heating can be, for example, 10° C. or higher and lower than 900° C.

The reaching pressure range by decompression can be, for example, $1.0 \times 10^{-10}$ to $1.0 \times 10^3$ Pa.

Step (6): Re-Calcining (Annealing) Step

The step (6) is a step of subjecting the solid component after the step (5) to a heat treatment at lower than 900° C.

The atmosphere of the heat treatment is not limited, and is preferably an atmosphere containing oxygen such as air. The temperature of the heat treatment can be 100° C. or higher. The holding time of the heat treatment can be set to 1 minute to 24 hours. In particular, it is preferable to perform heating at a holding temperature of 350° C. or higher for 0.1 hours or more and 5 hours or less.

When the method for producing a positive electrode active material of the present invention is used, a positive electrode active material obtained from a battery mixture can be reused in the same manner as an unused active material. A method for producing an electrode and a battery using a positive electrode active material is well known.

The discharge capacity of the positive electrode active material according to the embodiment of the present invention finally obtained can be 150 mAh/g or more.

EXAMPLES

Hereinafter, the present invention will be described in more detail with reference to examples, but the present invention is not limited to the following examples unless the gist thereof is changed.

Measurement of physical properties of the positive electrode active material and a charge and discharge test by a battery using the positive electrode active material were performed as follows.

(1) Content of Element

A solution and an acid solution in which a powder was dissolved were analyzed for the content of an alkali metal element contained in the solution and the powder using an ICP emission spectrometer (for example, SPS3000 manufactured by SII NanoTechnology Inc.).

(2) Charge and Discharge Test

1. Production of Electrode (Positive Electrode)

In order to measure the discharge capacity of the positive electrode active material, an electrode (positive electrode) was produced according to the following procedure.

Each positive electrode active material, a binder (PVdF #1100 (manufactured by KUREHA CORPORATION)), and a conductive material (acetylene black (manufactured by Denki Kagaku Kogyo Co., Ltd., product number: DENKA BLACK HS100) were mixed such that the weight ratio of the positive electrode active material:the binder:the conductive material was 92:3:5. Here, as PVdF being the binder, a binder solution in which PVdF was dissolved in NMP in advance was used. NMP was added and adjusted so that the total weight of the positive electrode active material, the conductive material, and the binder in a positive electrode mixture paste was 50 wt %. The positive electrode mixture paste was produced by kneading with a planetary centrifugal mixer (ARE-310 manufactured by THINKY CORPORATION).

As the binder solution, an NMP solution in which PVdF being the binder was dissolved was used, and NMP was added and adjusted so that the total weight of the positive electrode active material, the conductive material, and the binder in the positive electrode mixture paste was 50 wt %.

The positive electrode mixture paste was applied onto an aluminum foil 1085 for a lithium-ion secondary battery positive electrode current collector (manufactured by Nippon Foil Mfg. Co., Ltd.) having a thickness of 20 μm as a current collector so that the amount of the positive electrode active material was $3.0 \pm 0.1$ mg/cm², and then vacuum-dried at 150° C. for 8 hours to obtain a positive electrode. The electrode area of the positive electrode was set to 1.65 cm².

2. Production of Battery

A non-aqueous electrolyte secondary battery (coin-type battery R2032) was produced by combining the above-described positive electrode, an electrolytic solution, a separator, and a negative electrode. The battery was assembled in a glove box in an argon atmosphere.

As the electrolytic solution, a solution in which $LiPF_6$ was dissolved at a proportion of 1.0 mol/L in a mixed liquid of ethylene carbonate, dimethyl carbonate, and ethyl methyl carbonate at 30:35:35 (volume ratio) was used.

As the separator, a multilayer film separator in which a heat-resistant porous layer was layered on a polyethylene porous film was used. Metal lithium was used as the negative electrode.

3. Charge and Discharge Test

The internal resistance was measured using the produced coin-type battery after initial charge and discharge while holding at 25° C.

Initial Charge and Discharge

Maximum charge voltage: 4.3 V, Charge current: 0.2 C, Constant current constant voltage charge Minimum discharge voltage: 2.5 V, Discharge current: 0.2 C, Constant current discharge (Initial Discharge Capacity Recovery Rate)

When the 0.2 C discharge capacity in the initial charge and discharge of a reactivated positive electrode active material is denoted by X mAh/g, and the 0.2 C discharge capacity in the initial charge and discharge of an unused positive electrode active material is denoted by Y mAh/g, the initial discharge capacity recovery rate is obtained by the following formula (a).

$$\text{Initial Discharge Capacity Recovery Rate (\%)} = X/Y \times 100 \qquad \text{(a)}$$

Measurement of Internal Resistance

Constant current constant voltage charge was performed at a maximum charge voltage of 4.3 V and a charge current of 0.2 C, scanning was performed at a frequency of 1 MHz to 0.1 Hz using an AC impedance measuring device (frequency response analyzer Solartron 1260, Potentio/Galvanostat Solartron 1287), and a Cole-Cole plot showing an imaginary part on a vertical axis and a real part on a horizontal axis was created. Subsequently, in this Cole-Cole plot, the arc portion included in 100 Hz to 1 Hz was fitted with a circle, the diameter of the circle was taken as the resistance value, which was taken as the internal resistance of the positive electrode active material.

(Internal Resistance Recovery Rate)

When the internal resistance of the reactivated positive electrode active material is denoted by $x\Omega$ and the internal resistance of the unused positive electrode active material is denoted by $y\Omega$, the internal resistance recovery rate is obtained by the following formula (b).

$$\text{Internal Resistance Recovery Rate (\%)} = y/x \times 100 \qquad \text{(b)}$$

Examples and Comparative Examples

A. Production of Positive Electrode A

As the positive electrode active material, a positive electrode active material having a composition of $Li_{1.04}Ni_{0.60}Co_{0.20}Mn_{0.20}O_2$ and an R-3m crystal structure was used. The rated capacity of the positive electrode active material was set to 160 mAh/g, and the 1 C current was set to 160 mA/g. The 0.2 C initial discharge capacity measured in the charge and discharge test in the coin-type battery using this positive electrode active material (unused active material) as the positive electrode active material was 183 mAh/g.

As the conductive material, acetylene black HS100 (manufactured by Denki Kagaku Kogyo K.K.) was used.

As the binder and the solvent, an NMP solvent was further added to an NMP solution (manufactured by KUREHA CORPORATION) containing 12 wt % of PVdF #1100 being the binder to achieve a predetermined proportion.

The mass ratio of the positive electrode active material, the binder, and the conductive material in the positive electrode mixture was 92:3:5. The blending amount of the solvent was set to 50 mass % with respect to the entire positive electrode mixture paste.

The positive electrode mixture paste was applied onto an aluminum foil 1085 for a lithium-ion secondary battery positive electrode current collector (manufactured by Nippon Foil Mfg. Co., Ltd.) having a thickness of 20 μm using a doctor blade-type coater, and dried to obtain a positive electrode A. The amount of the positive electrode active material on the aluminum foil was 20 mg/cm².

B. Recovery of Electrode Mixture from Positive Electrode A

The electrode mixture was mechanically released from the current collector from the positive electrode A.

C. Electrolytic Solution Immersion Step

The released electrode mixture was pulverized into a powder. An electrolytic solution was added to the electrode mixture powder so that the slurry concentration was 1,500 g/L to form a slurry. Here, as the electrolytic solution, a solution in which $LiPF_6$ as the electrolyte was dissolved at a proportion of 1.0 mol/L in a mixed liquid of ethylene carbonate, dimethyl carbonate, and ethyl methyl carbonate at 30:35:35 (volume ratio) was used. The slurry of the electrode mixture was stirred at a maximum flow rate of 0.550 m/sec for 1 minute. Thereafter, the slurry was filtered to separate the solid phase, and the solid phase was dried under reduced pressure for 24 hours to obtain an electrolyte-containing electrode mixture. The electrolytic solution immersion step was performed in a glove box in an argon atmosphere.

D. Electrolyte-Containing Electrode Mixture Cleaning Step (Corresponding to Step (1))

In Example 1, dimethyl carbonate as the electrolyte cleaning solvent was added to the obtained electrolyte-containing electrode mixture so as to have a slurry concentration of 535 g/L to form a slurry, the mixture was stirred for 5 minutes at a peripheral speed of the tip of the stirring blade of 0.550 m/s, and then the slurry was separated into a solid component and a liquid component by filtration over 3 minutes. That is, the contact time between the solid component and the liquid component was 8 minutes.

The recovered solid component (electrode mixture) and liquid component (filtrate) were subjected to ICP elemental analysis and combustion IC measurement. The amount of P and the amount of F in the solid component after solid-liquid separation and the amount of P and the amount of F in the liquid component after solid-liquid separation are shown in Table 1.

The obtained solid component was dried under reduced pressure at 100° C. for 1 hour, and the electrode mixture after cleaning was recovered.

E. Activation Treatment Agent Mixing Step (Corresponding to Step (2))

$Li_2CO_3$ and $K_2SO_4$ as the activation treatment agents were mixed in the electrode mixture after cleaning at 0.15 mol and 0.15 mol with respect to 1 mol of the positive electrode active material in the electrode mixture to obtain a mixture (mixture before activation treatment). The melting start temperature of the activation treatment agent was 550° C.

F. Heating Step (Corresponding to Step (3))

The obtained mixture before the activation treatment was put in an alumina calcining container, which was placed in an electric furnace. Under atmospheric pressure, the mixture was subjected to an activation treatment at a holding temperature of 700° C. for a holding time of 3 hours. The heating rate was set to 300° C./hour, and the cooling to room temperature was natural cooling. After cooling to room temperature, the mixture after heating was recovered.

G. Step of Removing Alkali Metal (Corresponding to Water Washing and Solid-Liquid Separation in Step (4))

The mixture after heating was pulverized, water was added thereto, and the mixture was stirred for 1 minute to form a slurry. Thereafter, the slurry was separated into a solid component and a liquid component by filtration over 3 minutes. The slurry concentration was set to 20 g/L, the contact time with water was set to 4 minutes, and the peripheral speed (maximum flow rate) of the tip of the stirring blade was set to 0.785 m/s.

H. Step of Drying Positive Electrode Active Material (Corresponding to Step (5))

The obtained solid component was dried under reduced pressure at 100° C. for 1 hour. The time required for the ratio of the saturated water vapor pressure of water at the temperature of the solid component to the environmental atmospheric pressure at which the solid component exists to reach 80% after the slurry was separated into the solid component and the liquid component was 20 minutes.

H. Step of Re-Calcining Positive Electrode Active Material (Corresponding to Step (6))

The recovered positive electrode active material after water washing was put in an alumina calcining container, which was placed in an electric furnace. Under atmospheric pressure, the mixture was heated at a holding temperature of 700° C. for a holding time of 1 hour. The heating rate was set to 300° C./hour, and the cooling to room temperature was natural cooling. After cooling to room temperature, the reactivated positive electrode active material was recovered.

As described above, a positive electrode active material of Example 1 was obtained.

Examples 2 and 3 were similar to Example 1 except that the slurry concentration was set to 1,070 g/L and 107 g/L, respectively, in the cleaning of the electrode mixture in D (step (1)).

Example 4 was similar to Example 1 except that ethanol was used as the electrolyte cleaning solvent and the slurry concentration was set to 395 g/L in the cleaning of the electrode mixture in D (step (1)).

Example 5 was similar to Example 1 except that acetone was used as the electrolyte cleaning solvent and the slurry concentration was set to 395 g/L in the cleaning of the electrode mixture in D (step (1)).

Example 6 was similar to Example 1 except that water was used as the electrolyte cleaning solvent and the slurry concentration was set to 500 g/L in the cleaning of the electrode mixture in D (step (1)).

Example 7 was similar to Example 2 except that in the cleaning of the electrode mixture in D (step (1)), the stirring time of the slurry was set to 1 minute, and then the slurry was filtered over 3 minutes, and the contact time between the electrode mixture and the electrolyte cleaning solvent, that is, the contact time between the solid component and the liquid component was set to 4 minutes.

Example 8 was similar to Example 1 except that in the cleaning of the electrode mixture in D (step (1)), the slurry was allowed to stand for 1,437 minutes without stirring the slurry, and then the slurry was filtered over 3 minutes, the contact time between the electrode mixture and the electrolyte cleaning solvent, that is, the contact time between the solid component and the liquid component was set to 1,440 minutes, that is, 24 hours, and the slurry concentration was set to 11 g/L.

Example 9 was similar to Example 1 except that in the cleaning of the electrode mixture in D (step (1)), water was used as the electrolyte cleaning solvent, the slurry concentration was set to 5 g/L, the stirring time of the slurry was set to 1,437 minutes, and then the slurry was filtered over 3 minutes, the contact time between the electrode mixture and the electrolyte cleaning solvent, that is, the contact time between the solid component and the liquid component was set to 1,440 minutes, that is, 24 hours, and the peripheral speed of the tip of the stirring blade was set to 0.942 m/s.

Comparative Example 1 was similar to Example 1 except that the cleaning of the electrode mixture in D (step (1)) was not performed.

Comparative Example 2 was similar to Example 1 except that the slurry concentration was set to 2,140 g/L in the cleaning of the electrode mixture in D (step (1)).

Comparative Example 3 was similar to Example 8 except that the addition of the activation treatment agent to the solid component in E (step (2)) was not performed.

Comparative Example 4 was similar to Example 9 except that the slurry concentration was set to 2 g/L.

In Examples 1 to 9 and Comparative Examples 1 to 4, the solid component (electrode mixture) and the liquid component (filtrate) after separation in the step D (step (1)) were subjected to ICP elemental analysis and combustion IC measurement. The amount of P and the amount of F in the solid component after solid-liquid separation and the amount of P and the amount of F in the liquid component after solid-liquid separation in the cleaning step in D (step (1)) are shown in Tables 1 and 2.

With respect to the recovered reactivated positive electrode active material, a coin-type battery was produced, and a charge and discharge test was performed. The discharge capacity and the internal resistance were measured by the charge and discharge test, and the initial discharge capacity recovery rate and the internal resistance recovery rate were obtained.

The initial discharge capacity recovery rate and the internal resistance recovery rate in each of examples and comparative examples are shown in Tables 1 and 2.

TABLE 1

|  |  |  | New product | Example 1 | Example 2 | Example 3 | Example 4 | Example 5 | Example 6 | Example 7 | Example 8 | Example 9 |
|---|---|---|---|---|---|---|---|---|---|---|---|---|
| Step D | Electrolyte cleaning solvent type | — | — | — | DMC | DMC | DMC | Ethanol | Acetone | Water | DMC | DMC | Water |
|  | Slurry concentration | g/L | — | — | 535 | 1070 | 107 | 395 | 395 | 500 | 1070 | 11 | 5 |
|  | Contact time between solid component and liquid component | min |  | — | 8 | 8 | 8 | 8 | 8 | 8 | 4 | 1440 | 1440 |

TABLE 1-continued

|  |  | New product | Exam- ple 1 | Exam- ple 2 | Exam- ple 3 | Exam- ple 4 | Exam- ple 5 | Exam- ple 6 | Exam- ple 7 | Exam- ple 8 | Exam- ple 9 |
|---|---|---|---|---|---|---|---|---|---|---|---|
| Peripheral speed of tip of stirring blade | m/s |  | 0.550 | 0.550 | 0.550 | 0.550 | 0.550 | 0.550 | 0.550 | 0 | 0.942 |
| Amount of P in solid component after solid-liquid separation | mass % | — | 0.14 | 0.33 | 0.027 | 0.18 | 0.31 | 0.097 | 0.48 | 0.025 | <0.0050 |
| Amount of F in solid component after solid-liquid separation | mass % | — | 1.9 | 2.4 | 1.5 | 2 | 2.2 | 1.6 | 2.8 | 1.5 | 1.7 |
| Amount of P in liquid component after solid-liquid separation | mass % | — | 0.59 | 1.2 | 0.13 | 0.63 | 0.67 | 0.38 | 1.2 | 0.01 | 0.0059 |
| Amount of F in liquid component after solid-liquid separation | mass % | — | 1.9 | 3.9 | 0.5 | 2.1 | 2.2 | 1.3 | 4.0 | 0.048 | 0.024 |
| Initial discharge capacity | mAh/g | 183 | 158 | 151 | 154 | 163 | 159 | 152 | 147 | 156 | 174 |
| Internal resistance at SOC 100% | Ω | 17.0 | 46.2 | 67.3 | 48.7 | 71.7 | 42.5 | 55.7 | 91.8 | 17.4 | 35.4 |
| Initial discharge capacity recovery rate | % | 100 | 86.3 | 82.5 | 84.2 | 89.1 | 86.9 | 83.1 | 80.3 | 85.1 | 95.1 |
| Internal resistance recovery rate | % | 100 | 36.8 | 25.3 | 34.9 | 23.7 | 40.0 | 30.5 | 18.5 | 97.5 | 48.0 |

TABLE 2

|  |  |  | Comparative Example 1 | Comparative Example 2 | Comparative Example 3 | Comparative Example 4 |
|---|---|---|---|---|---|---|
| Step D | Electrolyte cleaning solvent type | — | — | DMC | DMC | Water |
|  | Slurry concentration | g/L | — | 2140 | 11 | 2 |
|  | Contact time between solid component and liquid component | min | — | 8 | 1440 | 1440 |
|  | Peripheral speed of tip of stirring blade | m/s | — | 0.550 | 0 | 0.942 |
|  | Amount of P in solid component after solid-liquid separation | mass % | 1.3 | 0.77 | 0.025 | <0.0050 |
|  | Amount of F in solid component after solid-liquid separation | mass % | 5.3 | 3.6 | 1.5 | Not evaluated |
|  | Amount of P in liquid component after solid-liquid separation | mass % | — | 2.3 | 0.01 | 0.0019 |
|  | Amount of F in liquid component after solid-liquid separation | mass % | — | 7.6 | 0.048 | 0.0080 |
| Initial discharge capacity |  | mAh/g | 91 | 126 | 136 | 144 |
| Internal resistance at SOC 100% |  | Ω | 2056 | 289 | 474.6 | 47.2 |
| Initial discharge capacity recovery rate |  | % | 49.7 | 68.9 | 74.3 | 78.7 |
| Internal resistance recovery rate |  | % | 0.8 | 5.9 | 3.6 | 36.0 |

In Examples 1 to 9 in which the amounts of P and F in the liquid component after solid-liquid separation and the amount of P in the solid component after solid-liquid separation were set within the predetermined ranges in the step (1) and mixing with the activation treatment agent was also performed, the maintenance rate of the initial discharge capacity was higher and the recovery rate of the internal resistance was also higher than in Comparative Examples 1 to 4.

The invention claimed is:

1. A method for producing a positive electrode active material, comprising the steps of:
(1) bringing an electrode mixture containing a positive electrode active material, a binder, and an electrolyte into contact with an electrolyte cleaning solvent to obtain a slurry containing a solid component and a liquid component, and then separating the slurry into the solid component and the liquid component, wherein an amount of P in the liquid component after separation is 0.0020 to 2.0 mass %, an amount of F in the liquid component after separation is 0.01 to 7.0 mass %, and an amount of P remaining in the solid component after separation is 0.7 mass % or less;
(2) mixing an activation treatment agent containing one type or two or more types of alkali metal compounds with the separated solid component; and
(3) heating a mixture obtained to a holding temperature equal to or higher than a melting start temperature of the activation treatment agent to activate the positive electrode active material contained in the mixture.

2. The method according to claim 1, wherein the positive electrode active material is a composite oxide containing one or more types of elements selected from the following element group 1 and one or more types of elements selected from the following element group 2:

element group 1: Ni, Co, Mn, Fe, Al, and P;

element group 2: Li, Na, K, Ca, Sr, Ba, and Mg.

3. The method according to claim 1, wherein the positive electrode active material is represented by the following formula:

$$Li_{1+a}M^2{}_bM^1{}M^T{}_cO_{2+d}X_e$$

wherein $M^2$ represents at least one type of element selected from the group consisting of Na, K, Ca, Sr, Ba, and Mg, $M^1$ represents at least one type of element selected from the group consisting of Ni, Co, Mn, Fe, Al, and P, $M^T$ represents at least one type of element selected from the group consisting of transition metal elements other than Ni, Co, Mn and Fe, X represents at least one type of element selected from the group consisting of nonmetallic elements except O and P, and $-0.4 < a < 1.5$, $0 \leq b < 0.5$, $0 \leq c < 0.5$, $-0.5 < d < 1.5$, and $0 \leq e < 0.5$ are satisfied.

4. The method according to claim 1, wherein in the step (1), a concentration of the solid component with respective to a volume of the slurry is 3 to 2,000 g/L.

5. The method according to claim 1, wherein in the step (1), a contact time between the solid component and the liquid component is 1 minute or more and less than 25 hours.

6. The method according to claim 1, wherein in the step (1), the electrode mixture and the electrolyte cleaning solvent are stirred to obtain the slurry.

* * * * *